Jan. 18, 1966       D. W. MONTGOMERY       3,230,373
DEVICE FOR THE STORAGE OF A HEAT EVOLVING MATERIAL
Original Filed April 17, 1959
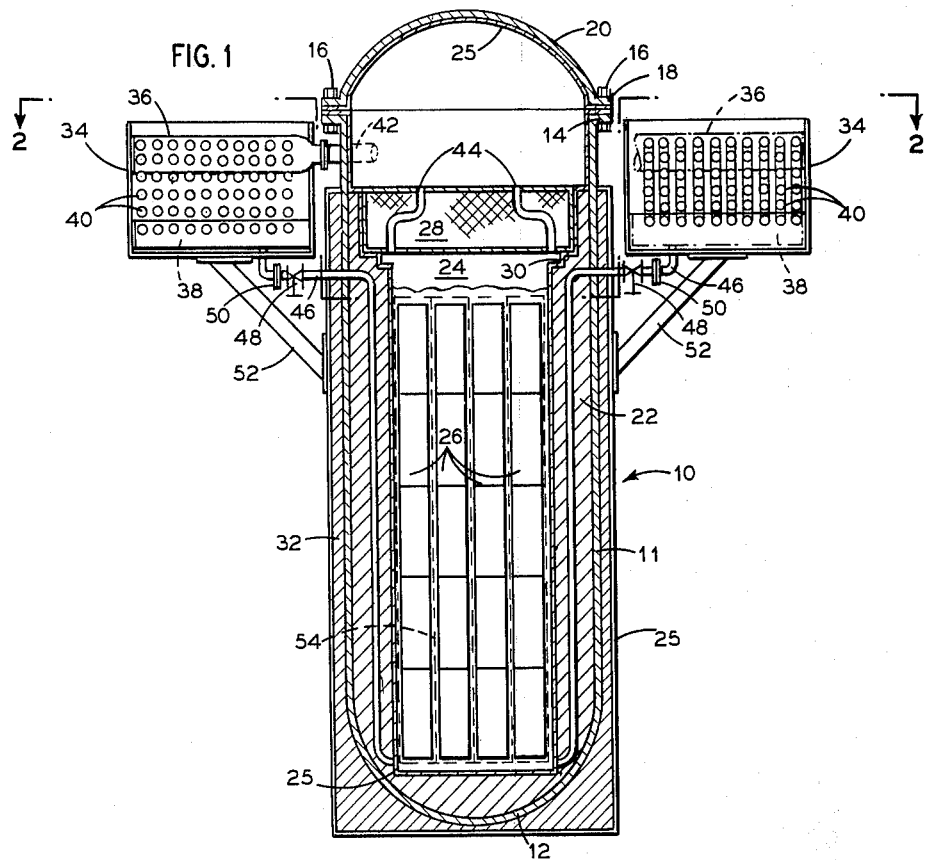
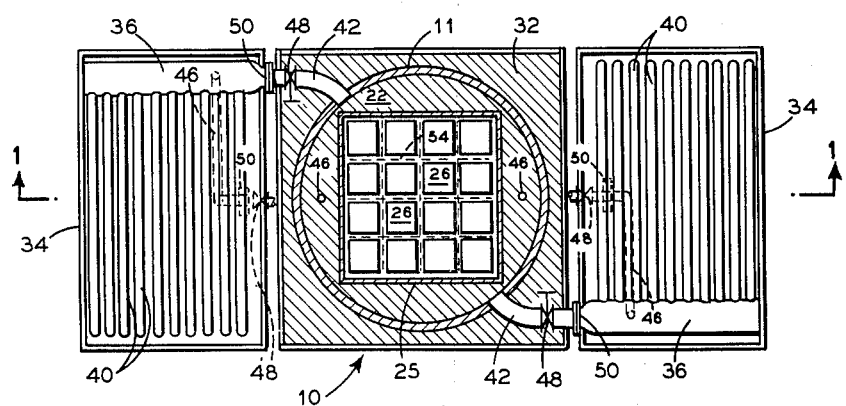
INVENTOR.
Donald W. Montgomery
BY
ATTORNEY

United States Patent Office 3,230,373
Patented Jan. 18, 1966

3,230,373
DEVICE FOR THE STORAGE OF A HEAT EVOLVING MATERIAL
Donald W. Montgomery, Lynchburg, Va., assignor to The Babcock & Wilcox Company, New York, N.Y., a corporation of New Jersey
Original application Apr. 17, 1959, Ser. No. 807,196, now Patent No. 3,046,403, dated July 24, 1962. Divided and this application Apr. 17, 1962, Ser. No. 188,069
The portion of the term of the patent subsequent to July 24, 1979, has been disclaimed and dedicated to the Public
5 Claims. (Cl. 250—106)

This invention relates in general to a storage container for a heat evolving material and in particular to a storage and shipping cask for a heat evolving radiation source. This application is a division of my copending application, Serial No. 807,196, filed April 17, 1959, and issued on July 24, 1962, as U.S. Patent No. 3,046,403.

The commercial operation of heterogeneous power reactors will involve the storage, handling, and transfer of spent fuel elements for reprocessing at approved, designated sites. Thus a commercially practicable shipping cask for such service is an important adjunct to the economic production of nuclear power. This is particularly so since the spent fuel elements contain a certain amount of residual radioactivity and will require shielding to prevent radiation damage to personnel and objects nearby as well as a cooling system to remove the heat released by the spent fuel elements. Lead casks have been used in the past to provide the shielding with cooling provided by natural heat transfer through the walls of the cask to the atmosphere. While such apparatus has satisfactorily met the storage and transportation needs of research and development reactors, the probability of handling larger quantities of spent fuel elements from industrial reactors and the high costs associated with such handling indicates the need for an improved cask design.

The present invention describes a spent fuel storage and shipping cask, in the design of which the primary objectives are safety and flexibility of operation combined with economy of storage and shipment. This economy is obtained by making the cask small enough to be shipped on any standard railroad car and yet large enough to contain enough elements to lower the shipment charge per unit of fuel shipped.

Further, the present invention provides a cylindrical steel vessel embedded in a rectangular cask of radiation shielding material for containing the spent fuel elements in conjunction with an exterior heat exchanger for the removal of the heat generated by the decay of radioactive fission products in the spent fuel. The vessel is adapted to contain a fluid, such as water, that may be circulated through the vessel and the heat exchanger to conduct the heat from the spent fuel elements to the heat exchanger where the fluid is cooled by air circulating across the heat exchanger tubes.

Also, it is a provision of the present invention to permit pressurization of the vessel and heat exchange apparatus since they are designed to withstand superatmospheric pressures. This permits the heat energy generated within the vessel to increase the pressure contained therein should the heat exchange apparatus become incapable of removing all the heat generated. This pressurization could continue for a sufficient length of time to permit isolation of the heat exchange apparatus for repair or replacement of defective parts.

Furthermore, the present invention provides a lining of radiation shielding in association with the pressure vessel to prevent any harmful radiation from the spent fuel therein from escaping the confines of the shipping cask. This lining is arranged to provide a substantially constant thickness of shielding surrounding an optimum number of fuel elements contained within the shipping cask with minimum overall outside dimensions.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described a preferred embodiment of the invention.

Of the drawings:
FIG. 1 is a vertical section through the shipping cask and associated heat exchangers;
FIG. 2 is a plan section taken along line 2—2 of FIG. 1.

In the drawings there is shown the shipping cask 10 comprising a vertically elongated pressure vessel 11 of circular cross section having a lower dished head 12 and terminating at the upper end in an enlarged portion forming a closure flange 14. Mating with this flange 14 and removably attached thereto, by a plurality of threaded bolts 16 through an upper closure flange 18, is an upper dished head 20, of which the upper closure flange 18 is an integral part. Integral with the interior of the vessel 11 and extending from the bottom thereof to a position just below the closure flange 18 is a lining 22 of radiation shielding material. This lining 22 has an outer surface conforming to the inner surface of the vessel 11 and an inner surface which defines a vertically elongated rectangular cavity 24. This cavity is adapted to accommodate a cooling fluid, such as water, for cooling the spent fuel elements 26 also contained therein. The top of this cavity 24 is closed by a removable shielding plug 28 which provides radiation shielding over the top of the spent fuel elements 26 and yet allows access to the cavity. The joint between the shielding plug 28 and the inner lining 22 is provided with a series of setbacks 30 which reduce the possibility of radiation leakage.

Enclosing the lower dished head 12 and extending exterior to the vessel 11 up to the top of the inner lining 22 is an outer lining 32 of radiation shielding material. This lining 32 has an inner surface conforming to the outer surface of the vessel 11 and an outer surface of the same general cross section as the inner rectangular cavity 24. The corners of these two rectangular cross sectional areas are diagonally aligned so as to provide the cavity 24 with a radiation shield of substantially constant cross section in a minimum of overall dimensions. At the same time a rectangular space is provided within the circular vessel 11 for optimally stacking spent fuel elements. All of the shielding in contact with the cooling fluid in the vessel is provided with a cladding 25 of stainless steel.

Exterior of the vessel 11 and shielding 32 are heat exchangers 34 comprising an inlet header 36 and an outlet header 38 connected by a plurality of heat exchange tubes 40. A specific example of the type heat exchanger referred to is a horizontal fin tube steam condenser. The inlet header 36 is connected to the interior of the vessel 11 by a riser line 42 which opens into the upper portion of the vessel above the shielding plug 28. The shielding plug 28 is provided with a plurality of conduits 44 therethrough which communicate with the shielded cavity 24 and provide flow passes between the cavity and the riser line 42. These conduits 44 are further provided with an offset between the top and the bottom of the shielding plug 28 which reduces the possibility of the escape of radiation from the shielded cavity 24. An outlet header 38 is connected to the interior of the vessel 11 by a downcomer line 46 which extends through the outer shielding 32 and the vessel shell and then down through the inner shielding 22 before terminating at the bottom of the cavity 24. Both the riser and downcomer lines, 42 and 46, are provided with valves 48 and couplings 50 adjacent the headers, 36 and 38, to permit the isolation and removal of the heat exchanger. The heat exchangers 34 are also removably connected to the vessel 11 via the supports 52.

Suitable handling means, such as lifting lugs, etc. (not shown) are provided for the entire apparatus, as well as for the individual components, to facilitate handling during loading and shipment.

The present invention contemplates the use of a fan or other such blower means (not shown) to circulate air over the heat exchanger tubes 40 to remove the heat from the fluid therein. It is important that the blowers not be directly connected to the underside of the heat exchangers or otherwise located so close to them as to restrict normal convection flow of air should the fans be out of operation.

In operation, the spent fuel elements 26 would be loaded into the shipping cask 10 within the shielded cavity 24. The cask would then be filled with water to a level just below the shielding plug 28 and the shielding plug would be fitted into place. Water is used because other liquids are often objectionable in the fuel chemical reprocessing operation. The use of water also eliminates the necessity of an intermediate heat transfer fluid since the water will not become radioactive during circulation. The upper head 20 of the vessel 11 would then be attached and sealed and the valves 48 closed. The cask 10 would then be loaded onto a railroad car and the heat exchangers attached. In the interim, heat generated by the spent fuel elements would pressurize the water in the cask. After the heat exchangers are attached, the valves 48 would be opened allowing the steam generated to circulate through the heat exchangers where it would be condensed and returned to the bottom of the cask. The flow path of the fluid in cooling the spent fuel elements would be as follows: The spent fuel elements would generate steam in the water within the shielded cavity 24. This steam would rise and pass through the shielding plug 28 via the conduits 44 and enter the inlet header 36 via the rise liner 42. The steam would then pass through the tubes 40 where it would be condensed by the air circulating exterior thereto. The condensed steam would then pass through the outlet header 38 and return to the shielded cavity 24 via the downcomer line 46. The blower means could then be put into operation to aid in cooling the heat exchanger tubes so the interior of the cask could be maintained at a pressure near atmospheric.

To eliminate any criticality hazard from the spent fuel, basket inserts 54 of a neutron absorbing material are arranged between the spent fuel elements 26. These baskets also provide for shipping broken or damaged fuel elements and reduce the hazard of inadvertently shipping a highly radioactive fuel element that would approach criticality if the neutron absorbing material were not present. Further, the baskets aid in the handling of the fuel elements and prevent their shifting during shipment.

In the event of a power loss to the fans, the cask would pressurize to approximately 50 p.s.i.g. and would be able to operate indefinitely in this manner due to the heat removal therefrom by the natural circulation of air over the heat exchanger tubes. If, during this operation without fans, one of the heat exchangers should rupture or be damaged, the damaged heat exchanger would be isolated from the system by the valves 48. During this period the cask pressure would increase to approximately 310 p.s.i.g. and would continue in operation with the heat being removed through the remaining heat exchanger. In the event of damage to both heat exchangers, they would be isolated and the cask would pressurize to about 480 p.s.i.g., the pressure setting of the safety valve (not shown). Operation under this extreme condition could be sustained for approximately four hours before all the coolant would be released through the safety valve, however, during this time one or both of the heat exchangers could be replaced and the former operating conditions restored. Thus, a system with these operating characteristics has inherent safeguards which contribute to safety and ease of operation, since a major malfunction of equipment must occur before operating difficulties are encountered.

While in accordance with the provisions of the statutes I have illustrated and described herein the best form and mode of operation of the invention now known to me, those skilled in the art will understand that changes may be made in the form of the apparatus disclosed without departing from the spirit of the invention covered by my claims, and that certain features of my invention may sometimes be used to advantage without a corresponding use of other features.

What is claimed is:

1. In a device for the storage of a heat evolving radiation source comprising a pressure vessel with a circular cross section having an opening therein, a removable closure for said opening, said radiation source contained within said pressure vessel, and a lining of radiation shielding material associated with the inner surface of said pressure vessel and arranged to envelop said radiation source.

2. In a device for the storage of a heat evolving radiation source comprising a pressure vessel with a circular cross section having an opening therein, a removable closure for said opening, said radiation source contained within said pressure vessel, and an inner and outer lining of radiation shielding material associated with the inner and outer surfaces of said pressure vessel and arranged to envelop said radiation source.

3. In a device for the storage of a heat evolving radiation source comprising a pressure vessel with a circular cross section having an opening therein, a removable closure for said opening, said radiation source contained within said pressure vessel, and an inner and outer lining of radiation shielding material associated with the inner and outer surfaces of said pressure vessel and arranged to envelop said radiation source, said lining of radiation shielding material having a removable portion coincident with said removable pressure vessel closure to permit access to the interior of said shielding.

4. In a device for the storage of a heat evolving radiation source comprising a pressure vessel with an opening therein, a removable closure for said opening, said radiation source contained within said said pressure vessel and having a rectangular cross section, said pressure vessel having a circular cross section, and an inner and outer lining of radiation shielding material associated with the inner and outer surfaces of said pressure vessel and arranged to envelop said radiation source, said lining of radiation shielding material having a removable portion coincident with said removable pressure vessel closure to permit access to the interior of said shielding, said inner shielding having a rectangular cavity therein to receive said rectangular radiation source, the outer surface of said inner shielding conforming to the inner surface of said cylindrical pressure vessel.

5. In a device for the storage of a heat evolving radiation source comprising a pressure vessel with an opening therein, a removable closure for said opening, said radiation source contained within said pressure vessel and having a rectangular cross section, said pressure vessel having a circular cross section, and an inner and outer lining of radiation shielding material associated with the inner and outer surfaces of said pressure vessel and arranged to envelop said radiation source, said lining of radiation shielding material having a removable portion coincident with said removable pressure vessel closure to permit access to the interior of said shielding, said inner shielding having a rectangular cavity therein to receive said rectangular radiation source, the outer surface of said inner shielding conforming to the inner surface of said cylindrical pressure vessel, said outer shielding having a rectangular cross section enclosing said cylindrical pressure vessel with the corners thereof diagonally aligned with the corners of said rectangular cavity of said inner shielding to provide shielding of substantially uniform thickness for said rectangular radiation source contained within said cylindrical pressure vessel.

References Cited by the Examiner

UNITED STATES PATENTS

| | | | |
|---|---|---|---|
| 2,811,487 | 10/1957 | Stanton | 250—108 X |
| 2,853,625 | 9/1958 | Ohlinger | 250—108 |
| 3,046,403 | 7/1962 | Montogomery | 250—106 |

OTHER REFERENCES

Radiation Shielding, Price et al., published by Pergamon Press, New York, New York, 1957, page 233.

RALPH G. NILSON, *Primary Examiner.*

ARCHIE R. BORCHELT, *Examiner.*